Feb. 20, 1923.
H. W. SIDES.
WEIGHING AND COUNTING SCALE.
FILED SEPT. 23, 1920.
1,446,131.
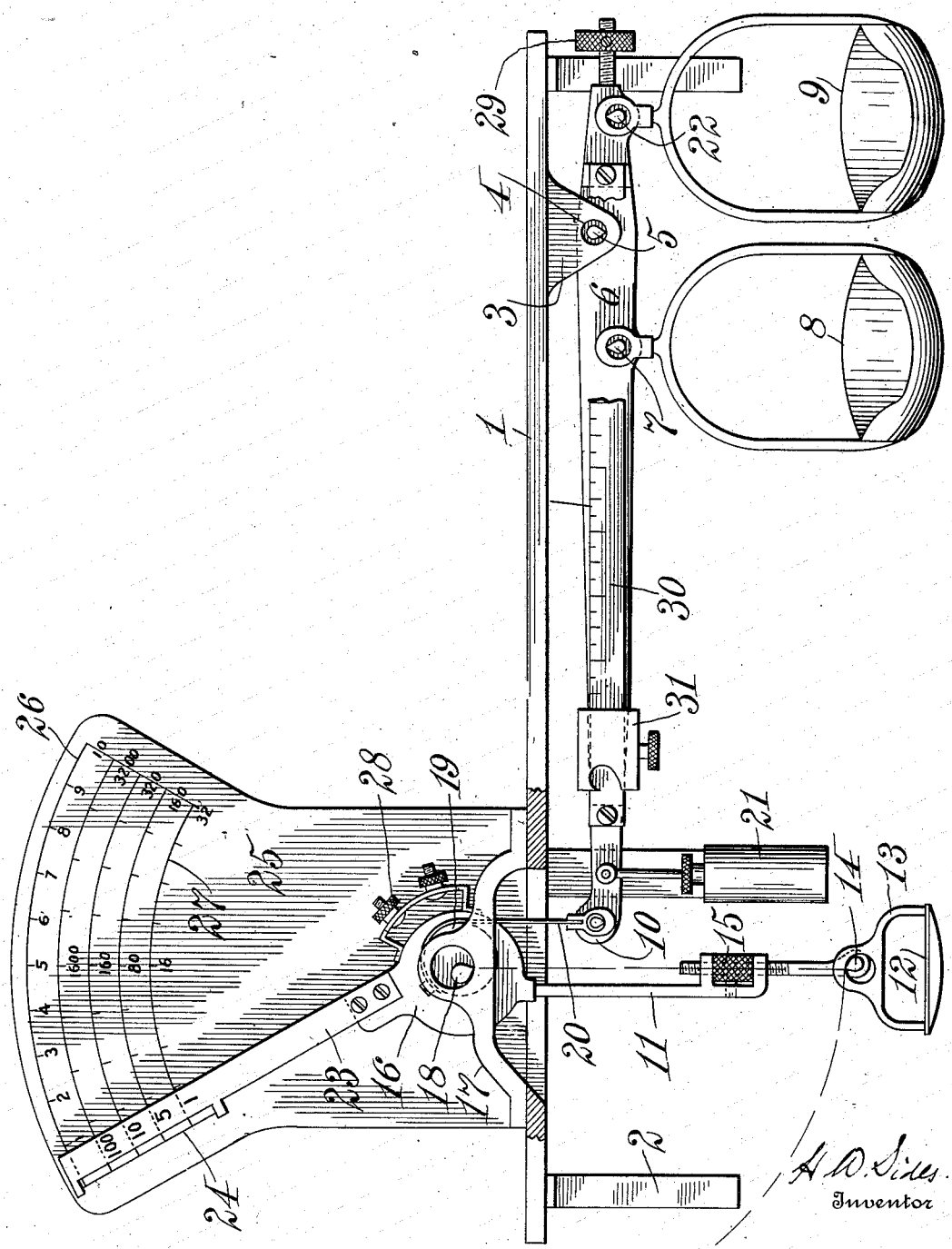
H. W. Sides.
Inventor
By R. J. McCarty
Attorney Patented Feb. 20, 1923.

1,446,131

UNITED STATES PATENT OFFICE.

HENRY W. SIDES, OF DAYTON, OHIO.

WEIGHING AND COUNTING SCALE.

Application filed September 23, 1920. Serial No. 412,189.

*To all whom it may concern:*

Be it known that I, HENRY W. SIDES, a citizen of the United States, residing at Dayton, in the county of Montgomery and State of Ohio, have invented certain new and useful Improvements in Weighing and Counting Scales, of which the following is a specification.

This invention relates to certain new and useful improvements in automatic weighing and counting scales of a type which is adapted to count a plurality of articles of uniform weight by using one or more of the articles as a unit.

One object of the invention is to provide a scale of the above type which is accurate, simple in construction and efficient in operation and possesses the features hereinafter described in connection with the accompanying drawings.

A further object of the invention is to pivotally mount the unit receptacle on a pendulum in such a manner that the load will always be supported at exactly the same point and there will be no variation in the effective length of the pendulum as the latter moves about its axis.

Other objects of the invention will appear as the device is described in detail.

The drawing illustrates a front elevation of a scale as constructed in accordance with my invention.

Referring more particularly to the said drawing, —1— represents a platform or table which, in the present instance, is supported on brackets —2—, but may be provided with any other well known support. Extending from the lower side of the said platform —1— are projections —3— provided with openings —4— which receive the fulcrum —5— of a scale beam —6—. The beam —6— is provided with a pivot —7— from which hangs a scoup —8— in which the articles to be weighed or counted are placed. The pivot —7— supports a scoop in the present instance, but it is to be understood that said pivot may be connected with a platform or any other receptacle well known in the art of scales. The beam —6— is also provided with a pivot —22— similar to the pivot —7— and on the opposite side of the fulcrum —5—. The pivot —22— supports a scoop —9— whose primary object is to balance the scale but which may be used for reverse weighing. When the articles to be weighed or counted are placed in the scoop —8—, the end —10— of the long arm of the beam is depressed to an extent commensurate with the weight of the articles in the scoop —8—. This variable depression is secured by a pendulum —11—, the effective weight of which, when using the scale as a counter, consists of a unit formed of one or more than one of the articles to be counted. When the scale is used for ascertaining weight, a suitable unit weight is provided. The unit above referred to is receivable by a receptacle or cup —12— supported by a yoke —13— from a frictionless pivot —14— on the lower end of the pendulum. The length of the pendulum —11— is adjustable by a threaded sleeve —15— in the present instance. The said pendulum extends downwardly from a hub —16— supported from the platform —1— by a yoke —17— which receives a pivot —18— mounted in the hub. The hub —16— is connected to the end —10— of the beam by a cam —19— and a' steel tape —20—. When the end —10— of the beam is depressed, the cup —12— and the unit therein will swing upward commensurate with the amount of depression of the end —10— of the beam and the quantity of articles in the scoop —8—. To permit the movement of the pendulum to be uniform for uniform variations in the quantity or weight of the articles in the scoop —8—, the cam —19— is provided. The cam —19— permits the beam to exert a greater leverage the higher the pendulum is swung from a normal position which position it is in when plumb with the pivot —18—.

The unit receptacle 12 is pivotally connected with the pendulum by means of a knife edged pivot which is so arranged that in all positions of the pendulum the weight of the receptacle will be supported thereon at exactly the same point. In the present instance the knife edged pivot is carried by the pendulum and is arranged at an angle at approximately 45° to the plumb line of the pendulum. This knife pivot extends into an opening, in the yoke 13 of the receptacle, of a diameter such that the yoke will swing freely on the knife edge of the pivot in all positions of the pendulum. Consequently, if the pendulum swings to the left, along the dotted line, the point of support of the unit receptacle on the pendulum will remain unchanged and the effective length of the pendulum will not be varied by the change in the position of the pendulum. In this manner I completely avoid the variation in the effective length of the pendulum which results from the ordinary pivot bearing, such as the cylindrical pivot pin, with which the point of support of the receptacle continually shifts, as the pendulum moves upwardly, from a point at the top of the cylindrical pivot to a point at one side thereof, thereby gradually increasing the effective length of the pendulum and rendering the computation more or less inaccurate. With the knife edged pivot arranged as above described the unit receptacle is always supported on an axis spaced an exact distance from the axis of the pendulum itself. The pendulum is also preferably mounted on a knife edged pivot which, as shown at 18, is arranged at an angle to the opening in the yoke 17, which opening is of a large diameter, so that the edge of the pivot of the pendulum will always be supported at exactly the same point on the bearing of the yoke. To absorb vibrations, the beam —6— is provided with a dash-pot —21— as is usual in pendulum balance scales. To indicate the extent of depression of the end —10— of the beam, whereby the weight or quantity of the articles in the scoop —8— is ascertained, the hub —16— is provided with a pointer —23— having an index thread —24— movable over the face of a segmental dial —25— mounted on the platform —1—. The dial —25— is provided with a plurality of calibrated lines, the upper one —26— of which is calibrated for pounds and is used when the scale is employed in ascertaining the weight. The remaining lines —27— are calibrated for quantity and lie in alignment with numbers on the pointer in the present instance which indicate the number of articles comprising the unit in the cup —12—. In the present instance the dial is calibrated for units consisting of one, five, ten and a hundred articles. When the scale is in use and it is desired to ascertain the number of pieces of uniform weight, either one, five, ten or a hundred of said articles are deposited in the cup —12— to form a unit while the articles to be counted are placed in the scoop —8—. The number of the articles may then be read from the lines —27— and the pointer —23—. In addition to the scoop —9— and the pendulum —11— of variable length, the scale may be adjusted for balance, by weights —28— on the hub —16— and a weight —29— on the end of the beam —6— opposite the end —10—. The balancing, or counter, weights, of which there may be one or more, are connected with the pendulum in such a manner that they can be adjusted to perfectly balance the pendulum, so that, when the scale is empty, the pendulum will remain in any position to which it may be moved. As here shown, the weights are in the form of nuts, mounted on threaded studs carried by the hub of the pendulum, but obviously they may be of any suitable character. The beam may be also provided with an adjustable weight and, as here shown, the beam has a calibrated portion 30 on which is slidably mounted a weight 31 of a well known type. By means of this adjustable weight I am able to weigh the load in the receptacle 8 when the indicator shows a desired number of articles without removing the articles from the unit receptacle. Moreover, when the indicator has reached the limit of its movement the scale may be caused to repeat by adjusting the weight on the beam until the indicator again assumes its zero position, after which additional articles may be placed in the receptacle and the indicator will indicate the number of said articles in the same manner as it would upon the first operation. It will be noted that after a number of articles in the scoop —8— have been counted by weight the same number may be counted in the scoop —9— thereby bringing the index back to zero.

Having described my invention, I claim:

1. In a scale of the character described, a beam, a supporting device connected with said beam to receive the articles to be counted or weighed, a pendulum operatively connected with said beam and mounted on a fixed axis, and a unit receptacle pivotally connected with said pendulum by a knife edged pivot arranged at an acute angle to the plumb line of said pendulum.

2. In a scale of the character described, a beam, a supporting device connected with said beam to receive the articles to be counted or weighed, a pendulum operatively connected with said beam and mounted on a fixed axis, a unit receptacle pivotally connected with said pendulum by a knife edged pivot arranged at an angle to the plumb line of said pendulum, and an indicator operatively connected with said pendulum.

3. In a scale of the character described, a beam, a supporting device connected with said beam to receive the articles to be counted or weighed, a pendulum operatively connected with said beam, mounted on a fixed axis and having near its lower end a fixed knife edged pivot arranged at an angle to the plumb line of the pendulum, a unit receptacle having a bearing opening of relatively large diameter to receive said knife edged pivot, and an indicator operatively connected with said pendulum.

4. In a scale of the character described, a supporting frame, a beam pivotally mounted on said supporting frame, a device connected with said beam to receive the articles to be counted or weighed, a pendulum pivotally connected with said frame by a knife edged pivot arranged at an angle to the plumb line of the pendulum, a unit receptacle pivotally connected with said pendulum by a knife edged pivot arranged at an angle to the plumb line of said pendulum, and an indicator operatively connected with said pendulum.

5. In a scale of the character described, a frame having a part provided with a bearing, a beam pivotally mounted on said frame, a device connected with said beam to receive the articles to be counted or weighed, a pendulum comprising a hub portion having rigidly secured thereto a knife edged pivot arranged at an angle to the plumb line of said pendulum and adapted to engage said bearing on said frame, an operative connection between said pendulum and said beam, a unit receptacle connected with said pendulum by a knife edged pivot arranged at an angle to the plumb line thereof, and an indicating member connected with the hub of said pendulum.

6. In a scale of the character described, a beam, a supporting device connected with said beam to receive the articles to be counted or weighed, a pendulum operatively connected with said beam and mounted on a fixed axis, a unit receptacle pivotally connected with said pendulum by a knife edged pivot arranged at an angle to the plumb line of said pendulum, an indicator operatively connected with said pendulum, and an adjustable counter weight for said pendulum.

7. In a scale of the character described, a beam, a supporting device connected with said beam to receive the articles to be counted or weighed, a pendulum operatively connected with said beam and mounted on a fixed axis, a unit receptacle pivotally connected with said pendulum by a knife edged pivot arranged at an angle to the plumb line of said pendulum, an indicator operatively connected with said pendulum, and an adjustable counter weight for said pendulum.

8. In a scale of the character described, a beam, a supporting device connected with said beam to receive the articles to be weighed, a pendulum operatively connected with said beam and having a hub portion pivotally mounted on a fixed axis, a unit receptacle pivotally connected with said pendulum, a counter weight adjustably mounted on said hub to balance said pendulum, and an indicator operatively connected with said pendulum.

9. In a scale of the character described, a beam, a supporting device connected with said beam to receive the articles to be counted or weighed, a pendulum operatively connected with said beam and mounted on a fixed axis, a unit receptacle pivotally connected with said pendulum by a knife edged pivot arranged at an angle to the plumb line of said pendulum, an indicator operatively connected with said pendulum, and a weight adjustable along said beam.

10. In a scale of the character described, a beam, a weight adjustable along said beam, a supporting device connected with said beam to receive the articles to be counted or weighed, a pendulum operatively connected with said beam and mounted on a fixed axis, a unit receptacle pivotally connected with said pendulum, and an indicator operatively connected with said pendulum.

In testimony whereof I affix my signature.

HENRY W. SIDES.